(12) United States Patent
Wirth, Jr. et al.

(10) Patent No.: US 6,221,135 B1
(45) Date of Patent: Apr. 24, 2001

(54) DUST COLLECTOR COUPLING SKIRT

(75) Inventors: John Wirth, Jr., Dubois; Jay L. Sanger; Paul Brutsman, both of Casper, all of WY (US)

(73) Assignee: Woodworker's Supply, Casper, WY (US)

( * ) Notice: Subject to any disclaimer, the term of this patent is extended or adjusted under 35 U.S.C. 154(b) by 0 days.

(21) Appl. No.: 09/398,752

(22) Filed: Sep. 17, 1999

(51) Int. Cl.[7] .................................................. B01D 46/00
(52) U.S. Cl. ................... 95/273; 55/356; 55/366; 55/429; 55/DIG. 3
(58) Field of Search ........................... 55/356, 366, 370, 55/428, 429, DIG. 3; 95/273

(56) References Cited

U.S. PATENT DOCUMENTS

| | | | | |
|---|---|---|---|---|
| 1,709,537 | * | 4/1929 | Owen | 55/366 |
| 1,715,861 | * | 6/1929 | Owen | 55/366 |
| 1,886,884 | * | 11/1932 | Jones | 55/429 |
| 1,936,262 | * | 11/1933 | Poet | 55/366 |
| 3,208,202 | * | 9/1965 | Herubel | 55/429 |
| 3,877,900 | * | 4/1975 | Mitchell | 55/366 |
| 3,895,929 | * | 7/1975 | Jysky et al. | 55/366 |
| 4,133,658 | * | 1/1979 | Callewyn | 55/429 |
| 4,715,872 | | 12/1987 | Snyder . | |
| 4,993,107 | * | 2/1991 | Zoni | 55/DIG. 3 |
| 5,163,985 | * | 11/1992 | Chen | 55/429 |
| 5,169,420 | | 12/1992 | Chen . | |
| 5,271,751 | | 12/1993 | Lägler . | |
| 5,690,710 | * | 11/1997 | Stephan | 55/366 |

* cited by examiner

Primary Examiner—Duane S. Smith
(74) Attorney, Agent, or Firm—Nixon & Vanderhye PC

(57) ABSTRACT

To adapt a dust collector for use with a trash can, a clamp-on skirt or adapter is provided to interconnect the lower opening of the dust collector housing to the rim or upper portion of a conventional trash can. In a preferred embodiment, the clamp-on skirt adapter is formed from the same material as conventional dust collection bags and can be clamped to the dust collector housing and trash can using, for example, conventional dust collection bag clamping straps.

20 Claims, 2 Drawing Sheets

DUST COLLECTOR COUPLING SKIRT

BACKGROUND OF THE INVENTION

1. Field of the Invention

The present invention relates to dust collectors and, more particularly, to dust collectors of the type having a large upper filter bag and a removable collection vessel.

2. Description of the Related Art

Dust collectors are a common component of the woodworking shop. Conventional dust collectors use a relatively low speed motor which drives a large diameter fan to generate a high volume of air flow at a relatively low pressure rise, which produces a highly efficient removal of dust.

A typical dust collector includes a housing having upper and lower openings, a blower, a motor for driving the blower, and a support stand for supporting the housing. A bag is attached to the upper opening and is made of a fabric material such as nylon or cotton which allows the air exhausted by the blower to exit the housing while retaining dust particles. A collection bag encircles the lower opening for collecting dust and debris for disposal. The collection bag may be made of plastic so as to be impermeable to air or may be formed from a cotton or nylon fabric material.

The inlet to the blower typically receives a flexible hose of four to six inches in diameter which is connected to a woodworking tool for purposes of removing dust, wood chips, and the like generated during cutting, boring, sanding and like operations which generate debris. The blower outlet is in turn coupled to the dust collector housing with another flexible hose.

The upper, filter bag is typically shaped to define a large surface area for ready airflow out of the housing. The lower collection bag is removable from the lower opening of the housing to facilitate its being emptied or changed. The support stand typically includes a base which supports the collection bag and the blower and motor assembly, and a support rod or bracket for mounting the housing at an elevated position. In some cases the base may have casters so that the dust collector can be moved or repositioned.

While dust collectors of the type described above have proved to be highly advantageous in workshops, that is not to say that dust collectors are without limitations and disadvantages. For example, the large volume collection bags attached to the lower opening of conventional dust collectors have proved to be hard to handle for debris removal from the workshop and disposal. Indeed, conventional dust collection bags may become unbalanced and fall to the side when disconnected from the dust collector housing, spilling some of the collected dust and debris to the workshop floor. Maneuvering the heavy unsupported bag for disposing of the collected dust or for depositing the collected dust in a central receptacle for later disposal can also result in further debris spillage or damage to the collection bag.

SUMMARY OF THE INVENTION

It is an objective of the invention to adapt a conventional dust collector for depositing collected dust and debris into a conventional trash can so that the hard to handle plastic or cloth bags can be eliminated from the dust collector system. To adapt the dust collector for use with a trash can, a clamp-on skirt or adapter is provided to interconnect the lower opening of the dust collector housing to the rim or upper portion of a conventional trash can. In a preferred embodiment, the clamp-on skirt adapter is formed from the same material as conventional dust collection bags and can be clamped to the dust collector housing and trash can using, for example, conventional dust collection bag clamping straps.

Thus, the invention is embodied in a dust collector coupling skirt for adapting a dust collector outlet to a rigid debris receptacle that comprises an adapter band formed from a flexible material so as to extend in a substantially continuous loop and having first and second axial end edges. A pocket is preferably defined adjacent at least one of the axial end edges of the adapter band and an elongated clamping strap is disposed in the pocket to extend at least about substantially the entire circumference of the band. The clamping strap includes a clamping mechanism for selectively increasing and decreasing a diameter of the strap to thereby selectively control a diameter of the one axial end of the adapter band. An exemplary embodiment, the strap is a conventional dust collection bag clamping strap consisting of a spring biased metal clamp and an elongated inelastic nylon strap.

A pocket is preferably defined adjacent each axial end of the adapter band for receiving a respective clamping strap, so that the adapter band can be readily attached to a dust collector housing at one end thereof and to an upper perimeter of a trash can at the other end thereof, so as to adapt the lower opening or outlet of the dust collector housing to the upper end or inlet of the trash can.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE PREFERRED EMBODIMENTS

Figure 1:
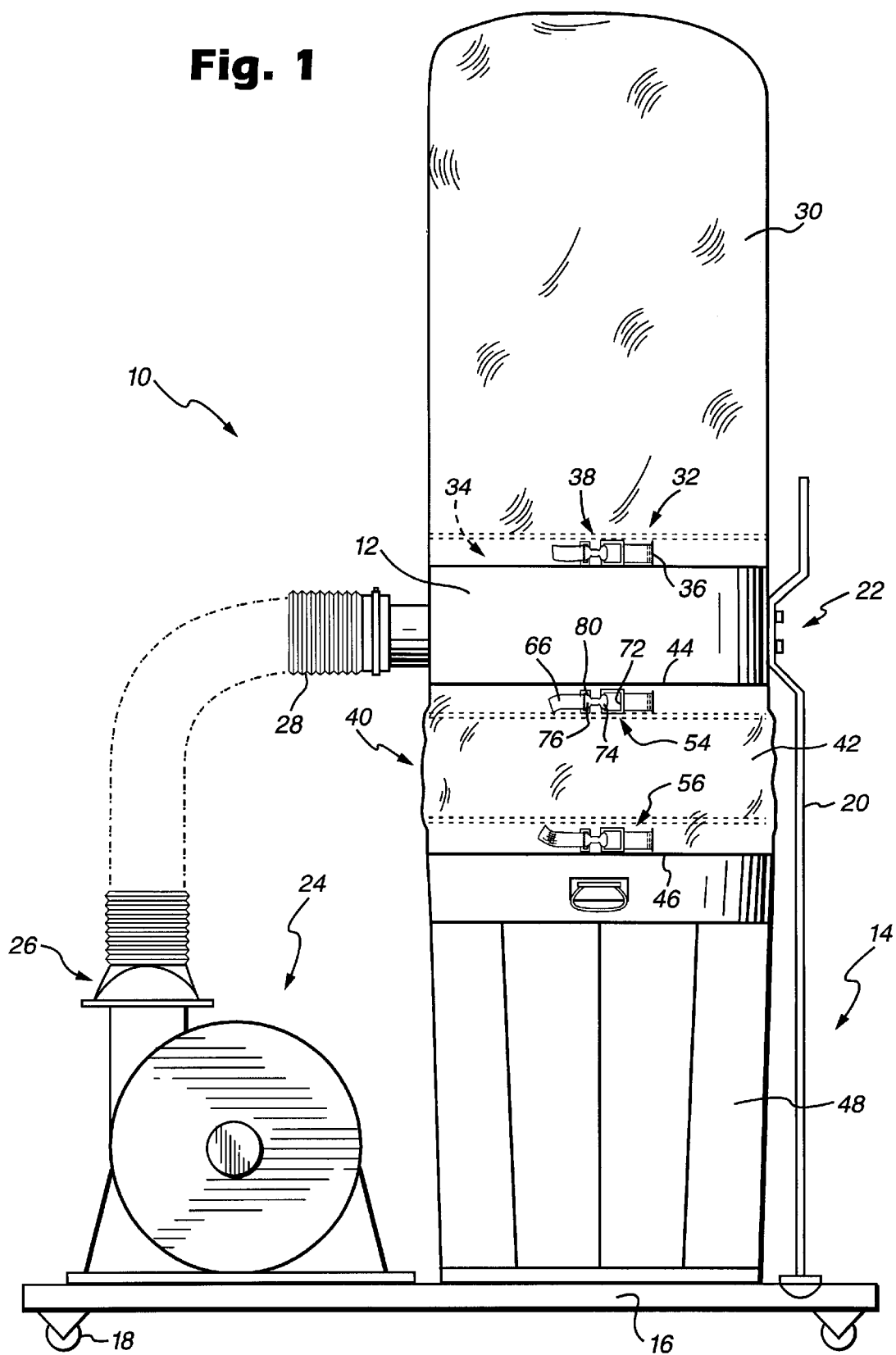
FIG. 1 is an elevational view of a dust collector adapted for use with a trash can in accordance with an exemplary embodiment of the invention.

As illustrated by way of example in FIG. 1, a dust collector apparatus 10 includes a dust collector housing 12 of generally cylindrical configuration having a substantially open top end and a substantially open bottom end and is connected to a suitable support frame generally designated 14. The support frame 14 of the dust collector 10 includes a platform 16 which preferably has casters or wheels 18 for facilitating relocation of the dust collector within a workshop facility. A vertical support 20 projects upwardly from the platform 16 and is bolted or clamped as at 22 to the dust collector housing 12. Although only a single vertically extending support 20 is illustrated in FIG. 1, if necessary or desirable, a pair of such vertical supports may be provided, e.g., on diametrically opposite sides of the dust collector housing. Moreover, although the illustrated support is disposed opposite the blower, shown generally at 24, the support(s) may be provided at other location(s) relative to the blower.

As mentioned above, in the illustrated embodiment dust collector 10 includes an external motor driven blower 24. Typically, a flexible hose (not shown) extends from the blower inlet to the woodworking machine or area within the woodworker shop from where debris is to be removed or collected. The blower outlet 26 is coupled to the collector plenum or housing 12 with a flexible hose 28. An upper bag 30 is secured to the upper opening of the housing 12. This bag 30 is formed from, e.g., a fabric material through which air but not the dust being collected can pass, for example, a five micron bag. In the illustrated embodiment, the upper bag is secured to the collector housing with a suitable fastening strap 32. The fastening strap 32 may be disposed over the material of the filter bag 30 or, preferably, is received in a pocket 34 defined adjacent the open end of the bag 30. In that case, each end of the strap projects through a suitable opening or an eyelet 36 in the pocket 34 to be tightened and fastened on the exterior of the bag 30. Strap 32 may be formed from any material that provides a secure, substantially airtight connection of the bag 30 to the collector housing 12. Thus, the strap may be formed from an elongated metal or plastic strip, or a piece of rope or strapping material. In the preferred embodiment, the strap is an inelastic nylon strap which is received and clamped by a spring loaded buckle or clamp 38 for quick attachment and quick release. Although a buckle or clamp fastener is preferred, the strap may be fastened by tying or by securing ends of the strap with an independent fastening structure.

Figure 2:
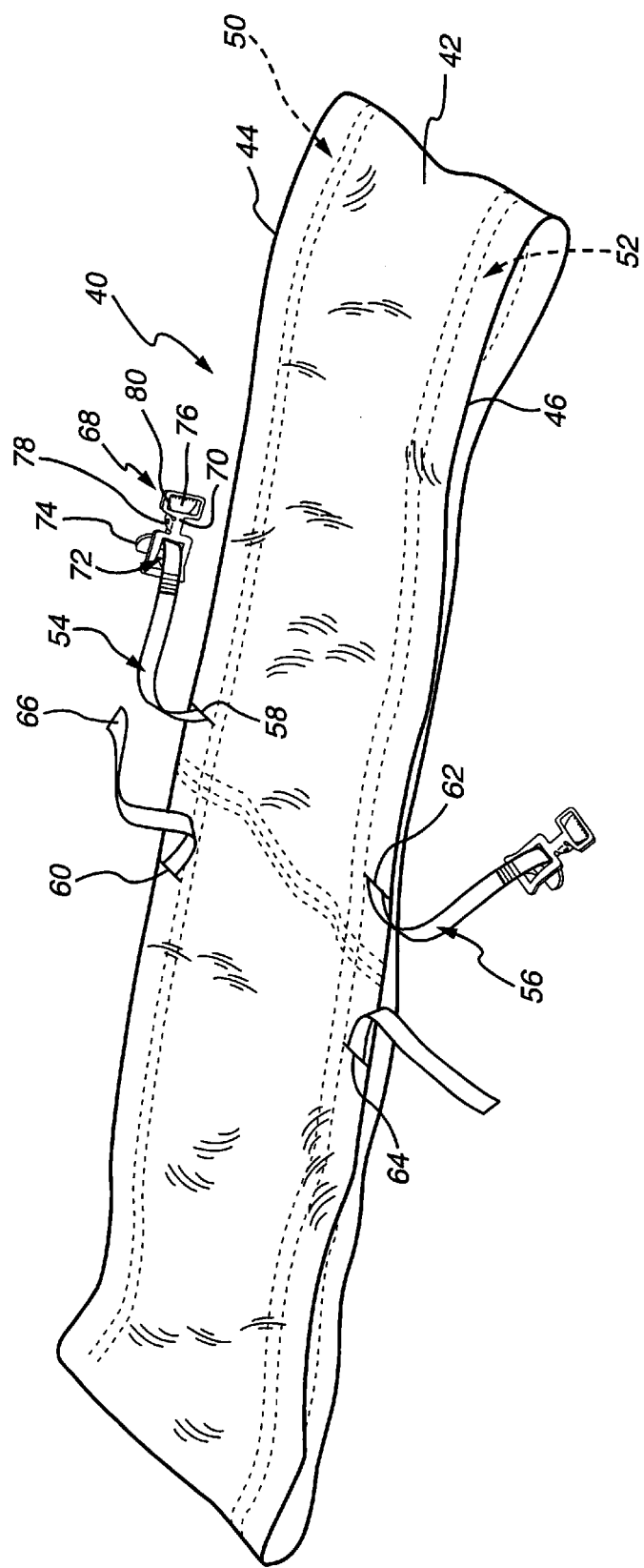
FIG. 2 is a view of a dust collector skirt provided in accordance with an exemplary embodiment of the invention.

Referring now to FIGS. 1 and 2, the dust collector connection skirt 40 provided in accordance with the invention will be described in greater detail. As shown in FIG. 2, the adapter skirt 40 is defined as a substantially continuous band 42 having first and second axial ends 44, 46. In the preferred embodiment of the invention, the band 42 is formed from the same material as a standard dust collection bag. Most preferably this material is a cotton or a nylon fabric to insure that the machine can breathe properly in spite of the provision of a rigid vessel or receptacle 48 for dust collection as discussed herein below. At least a portion of the adapter band 42 is formed as a double wall structure to define a pocket 50 adjacent at least one axial end 44 of the adapter. In the illustrated embodiment, each end 44, 46 of the adapter band 42 is formed as a double wall pocket 50, 52 by folding over and stitching an axial end portion of the adapter band to itself. These pockets define circumferential receptacles for the attachment straps 54, 56 for securing the band 42 to the dust collector housing 12 and dust collection receptacle 48, respectively. The straps are received in the pockets at each end of the band 42 by forming at least one and preferably two circumferentially spaced apart eyelets or openings 58, 60, 62, 64 so that the attachment straps 54, 56 can each be threaded through one opening or eyelet 58, 62 and circumferentially of the coupling band 42 through the pocket 50, 52, so as to emerge from the other eyelet or opening 62, 64 as with a conventional drawstring strap and pocket assembly.

In an exemplary embodiment of the invention, the dust collector coupling skirt 40 is provided as an accessory to a dust collector apparatus 10. Thus, the consumer would possess as a part of the dust collector assembly, a conventional dust collection bag having a fastening strap and clamp assembly for securing the same to the collector housing. When the dust collector coupling skirt 40 is used for connecting the dust collector housing to a rigid vessel 48 such as a garbage can, the connector strap of the conventional dust collection bag may be used for securing one of the ends of the coupling skirt 40 to one of the collector housing 12 and the collection vessel 48. Thus, the coupling skirt may be produced and sold having one strap 54 disposed in one pocket 50 at one end 44 of the adapter band 42. The other end of the adapter band 42 can then be provided with the connector strap from the standard dust collection bag. In the alternative, the adapter can be supplied with two clamping straps. While such a clamping strap could be secured to the exterior surface of the adapter band 42, to facilitate attachment and to insure that the strap will not become axially detached from the adapter band, whether or not the band is distributed with two straps, a pocket is preferably provided at each end of the coupling skirt for receiving a respective strap.

As illustrated in FIG. 1, in accordance with the present invention, a rigid dust collection vessel 48 is provided for receiving dust and debris from the dust collector housing. In the illustrated embodiment, the rigid dust collecting vessel is a conventional garbage can. The illustrated garbage can is made, for example, from steel and is a 30–33 gallon trash can so as to be of suitable volume for collecting dust from a conventional dust collector apparatus. The illustrated trash can has a generally cylindrical shape. However, it is to be understood that the invention is not limited to a cylindrical steel trash can. Indeed, the flexible dust collector adapter skirt could be disposed over and secured to a trash can formed from some other material, such as a plastic trash can, and of shape other than cylindrical, such as a square or a rectangular trash can. Furthermore, although in the illustrated embodiment, the unbiased perimeter of each axial end edge of the adapter skirt is the same, it is to be appreciated that the dust collector skirt could be of flared configuration so as to adapt the dust collector to a rigid or a relatively rigid receptacle of greater or lesser diametrical extent than the dust collector housing. Moreover, by suitably tightening the strap and clamping it in its tightened configuration, even if the skirt is uniformly dimensioned, it can be tightened about respective collector housings and collection vessels of different circumferences.

As mentioned above, the adapter skirt 40 of the invention may be secured to the dust collector housing 12 and dust collection vessel 48 with a conventional dust collection bag buckle-clamp and strap. Thus, as illustrated for example in FIG. 2, a conventional strap 54 comprising an inelastic nylon strap 66 having a metal buckle 68 attached to one end may be used for securing the adapter skirt in position. In the illustrated embodiment, the buckle 68 includes a metal plate 70 having eyelet 72 for being secured, e.g, permanently to one end of the strap 66 and eyelet 80 for receiving the other, free end of the strap. The clamp portion of the buckle includes a pivot lever having an actuation end 74 and a clamping end 76 and is mounted to pivot about a pivot pin 78 relative to the base plate 70. A spring (not shown) is coiled about the pivot pin so as to bias the clamping end 76 of the actuation lever towards the buckle base plate 70 in a known manner, to clamp the strap 66. Thus, when the strap is to be attached and tightened to either the dust collector housing 12 or collection vessel 48, the nylon strap 66 is threaded through eyelet 80 and pulled tight while the actuation end 74 of the pivot lever is depressed by the consumer. When the pivot lever is released, the spring-loading of the pivot lever causes the clamping end 76 to securely engage the strap 66 against the buckle base plate 70 (as shown in FIG. 1) to thereby retain the strap in a tightened configuration. Release of the strap is achieved by depressing the actuation end 74 of the lever to release the clamping end 76, so that the strap may be displaced relative to the buckle 68 to loosen or remove the coupling skirt 40.

As noted above, in the presently preferred embodiment, a pocket is defined adjacent each axial end of the adapter skirt to accommodate first and second attachment strap. As also mentioned above, the dust collector skirt may be distributed having only a single attachment strap so that the consumer uses the dust collection bag attachment strap for the other end of the skirt. To facilitate insertion of the strap, the pocket defined at one end of the adapter skirt may have a greater axial length (in the width direction of the strap) than the other end of the adapter skirt. This facilitates threading of the strap by the consumer. Alternatively, as shown, the pockets may be provided so as to be of equal size.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dust collector comprising:
   a housing having an outer peripheral wall, a substantially open top end and a substantially open bottom end;
   a motor and a blower driven by said motor for directing dust and debris to be collected into said housing;
   a filter component operatively coupled to said substantially open top end of said housing for allowing air to pass therethrough to vent from said housing while retaining particulate materials;
   a rigid collection vessel substantially vertically aligned with said substantially open bottom end of said housing for collecting dust and debris; and
   a coupling skirt extending between and operatively coupling said housing and said rigid collection vessel, said coupling skirt including an adapter band formed from a flexible material so as to extend in a substantially continuous loop and having first and second axial end edges, a first clamp assembly clamping said first axial end edge of said adapter band to said housing adjacent a lower end thereof and a second clamp assembly securing said second axial end edge of said adapter band to said rigid collection vessel thereby generally confining dust and debris to pass from said housing into said collection vessel.

2. A dust collector as in claim 1, wherein said first clamp assembly comprises a first elongated strap for securing said first axial end edge of said adapter to the outer peripheral surface of said housing.

3. A dust collector as in claim 2, wherein a pocket is defined adjacent said first axial end edge of the adapter band and said first elongated strap is disposed in said pocket so as to extend at least about substantially the entire circumference of the adapter band.

4. A dust collector as in claim 3, wherein a clamping fastener is coupled to one longitudinal end of said first elongated strap for receiving and clamping the other longitudinal end of said first elongated strap to secure said adapter band to said housing.

5. A dust collector as in claim 3, wherein said second clamp assembly comprises a second elongated strap for securing said second axial end edge of said adapter to the outer peripheral surface of said housing, and wherein a pocket is defined adjacent the second axial end edge of the adapter band for receiving the second elongated strap.

6. A dust collector as in claim 1, wherein said adapter band is formed from an air permeable material.

7. A dust collector as in claim 1, wherein said rigid collection vessel comprises a generally cylindrical, steel trash can.

8. A dust collector as in claim 1, further comprising a support stand, said support stand including a platform for receiving said collection vessel and a vertical support fixedly secured to said housing for suspending said housing above said platform.

9. A dust collector adapter for adapting a dust collector debris outlet to a rigid collection vessel comprising:
   an adapter band formed from a flexible material so as to extend in a substantially continuous loop and so as to have first and second axial end edges, a first pocket being defined adjacent the first axial end edge of the adapter band and a first elongated clamping strap disposed in said pocket so as to extend at least about substantially the entire circumference of the band for securely coupling said first axial end edge of said adapter band to one of the dust collector outlet and the rigid collection vessel.

10. A dust collector adapter as in claim 9, further comprising a second clamp assembly for securing said second axial end of said adapter band to the other of the housing and the rigid collection vessel thereby to generally confine dust and debris to pass from the housing into the rigid collection vessel.

11. A dust collector adapter as in claim 10, wherein said second clamp assembly comprises a second elongated strap for securing said second axial end edge of said adapter to an outer peripheral surface of the other of the housing and the rigid collection vessel.

12. A dust collector adapter as in claim 11, wherein a second pocket is defined adjacent said second axial end edge of the adapter band and said second elongated strap is disposed in said second pocket so as to extend at least about substantially the entire circumference of the adapter band.

13. A dust collector adapter as in claim 12, wherein a clamping fastener is coupled to one longitudinal end of said second elongated strap for receiving and clamping the other longitudinal end of said second elongated strap to selectively secure said adapter band to the other of the housing and the rigid collection vessel.

14. A dust collector adapter as in claim 9, wherein a clamping fastener is coupled to one longitudinal end of said first elongated strap for receiving and clamping the other longitudinal end of said first elongated strap to selectively secure the adapter band to said one of the dust collector outlet and the rigid collection vessel.

15. A dust collector adapter as in claim 9, wherein said adapter band is formed from an air permeable material.

16. A dust collector adapter as in claim 9, wherein said rigid collection vessel comprises a generally cylindrical, steel trash can.

17. A dust collector adapter as in claim 9, further comprising a support stand, said support stand including a platform for receiving said collection vessel and a vertical support fixedly secured to said housing for suspending said housing above said platform.

18. A method of collecting dust and debris comprising:
   providing a dust collector assembly including a housing having an outer peripheral wall, a substantially open top end and a substantially open bottom end; a motor; and a blower driven by said motor for directing dust and debris to be collected into said housing;
   providing a filter component;
   providing a coupling skirt including an adapter band formed from a flexible material so as to extend in a substantially continuous loop and having first and second axial end edges;

operatively coupling the filter component to said substantially open top end of said housing;

substantially vertically aligning a rigid collection vessel with said substantially open bottom end of said housing;

operatively coupling the first axial end of said adapter band to said bottom end of said housing;

operatively coupling the second axial end of said adapter band to said rigid collection vessel; and actuating said motor and said blower so as to direct dust and debris into said housing and collecting said dust and debris in said rigid collection vessel, said coupling skirt generally confining said dust and debris to pass from said housing into said collection vessel.

19. A method according to claim 18, wherein each said step of operatively coupling comprises clamping said respective axial end of said adapter band to said housing and said collection vessel, respectively.

20. A method as in claim 19, wherein a pocket is defined adjacent each axial end edge of the adapter band and an elongated strap is disposed in each said pocket so as to extend at least about substantially the entire circumference of the adapter band, wherein a clamping fastener is coupled to one longitudinal end of each said elongated strap for receiving and clamping the other longitudinal end thereof to thereby clamp said adapter band to the housing and rigid collection vessel, respectively.

* * * * *